United States Patent [19]

Huang et al.

[11] Patent Number: 4,509,949
[45] Date of Patent: Apr. 9, 1985

[54] WATER THICKENING AGENTS CONSISTING OF COPOLYMERS OF CROSSLINKED ACRYLIC ACIDS AND ESTERS

[75] Inventors: Chor Huang, Avon Lake; Robert K. Schlatzer, Chagrin Falls, both of Ohio

[73] Assignee: The B. F. Goodrich Company, Akron, Ohio

[21] Appl. No.: 503,957

[22] Filed: Jun. 13, 1983

[51] Int. Cl.$^3$ ............................ C08F 20/06; D06P 1/52
[52] U.S. Cl. ..................................... 586/558; 526/317
[58] Field of Search ........................... 8/558; 526/317

[56] References Cited

U.S. PATENT DOCUMENTS

| | | | |
|---|---|---|---|
| 2,798,053 | 7/1957 | Brown | 526/317 |
| 2,923,692 | 2/1960 | Ackerman et al. | 526/317 |
| 2,945,013 | 7/1960 | Ott | 526/317 |
| 3,915,921 | 10/1975 | Schlatzer, Jr. | 526/238.23 |
| 4,085,167 | 4/1978 | Lewis et al. | 526/317 |
| 4,112,155 | 9/1978 | Carel et al. | 8/558 |

FOREIGN PATENT DOCUMENTS 1209241  10/1970  United Kingdom ..................... 8/558

*Primary Examiner*—Joseph L. Schofer
*Assistant Examiner*—Peter F. Kulkosky
*Attorney, Agent, or Firm*—J. Hughes Powell, Jr.; Alan A. Csontos

[57] ABSTRACT

Polymers of 98.9 to 95.5 weight percent of olefinically unsaturated carboxylic acids containing at least one activated double bond, 1 to about 3.5 weight percent of an alkyl acrylate ester of acrylic or methacrylic acid wherein the alkyl group contains 10 to 30 carbon atoms and 0.1 to less than 1 weight percent of a crosslinking monomer, are efficient thickeners in many applications where high ionic environments are encountered and may be used at lower concentrations to obtain equivalent or better results than prior art thickeners, and have been found to be particularly effective in print paste applications wherein there are reactive dyes, direct dyes and disperse dyes with high and varying ionic content. Further, in screen printing, improved print pastes are provided when they contain the novel polymers of this invention that have better rheology with less bounce back on release of printing pressure, and textile prints so made have better penetration. The resulting prints have an excellent combination of sharpness, lack of wicking, penetration, levelness and color yield.

7 Claims, No Drawings

WATER THICKENING AGENTS CONSISTING OF COPOLYMERS OF CROSSLINKED ACRYLIC ACIDS AND ESTERS

BACKGROUND OF THE INVENTION

U.S. Pat. No. 3,915,921 discloses copolymers of 60 to 95 weight percent carboxylic acid monomers, 39.9 to 4 weight percent of alkyl esters of acrylic acid wherein the alkyl groups contain 10 to 30 carbon atoms and 0 to 6 weight percent of crosslinking monomers. These polymers, when at least partially neutralized by a basic material, absorb large amounts of water, are effective thickeners, and form water mucilages that have a much greater resistance to loss in viscosity when in the presence of salts such as sodium chloride than prior art thickeners such as those described in U.S. Pat. No. 2,798,053. While the materials described in these two prior art patents have many uses, there are some applications where these materials are not completely satisfactory. For example, as thickeners in print pastes for textile printing. When these prior art polymers are used in print paste formulations, the pastes often are stringy and/or have poor rheological properties, varying viscosities, often in undesirable ranges for printing, and do not result in good quality printing, i.e., use of such pastes do not provide sharp prints and high color yield because of wicking or flushing and loss of color on washing. Improved thickening agents that do not have these and other problems are desired.

SUMMARY OF THE INVENTION

Polymers of 98.9 to 95.5 weight percent of olefinically unsaturated carboxylic acids containing at least one activated double bond, 1 to about 3.5 weight percent of an alkyl acrylate ester of acrylic or methacrylic acid wherein the alkyl groups contain 10 to 30 carbon atoms and 0.1 to less than 1 weight percent of a crosslinking monomer, are efficient thickeners in many applications where high ionic environments are encountered and may be used at lower concentrations to obtain equivalent or better results than prior art thickeners. These polymers have been found to be particularly effective in print paste applications wherein there are reactive dyes, direct dyes and some disperse dyes with high and varying ionic content. Further, in screen printing, improved print pastes are provided when they contain the novel polymers of this invention that have better rheology with less bounce back on release of printing pressure, and textile prints so made have better penetration. The resulting prints have an excellent combination of sharpness, lack of wicking, penetration, levelness and color yield.

DETAILED DESCRIPTION

The carboxylic monomers useful in the production of polymers used in this invention are the olefinically-unsaturated carboyxlic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group,

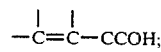

or as a part of a terminal methylene grouping $CH_2=<$. Olefinically-unsaturated acids of this class include such materials as the acrylic acids typified by the acrylic acid itself, methacrylic acid, ethacrylic acid, alpha-chloroacrylic acid, alpha-cyano acrylic acid, beta methylacrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid, itaconic acid, citraconic acid, mesaconic acid, glutaconic acid, aconitic acid, maleic acid, fumaric acid, and tricarboxy ethylene. As used herein, the term carboxylic acid includes anhydrides as well as the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

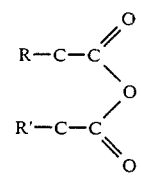

wherein R and R' are selected from the group consisting of hydrogen, halogen and cyanogen ($-C\equiv N$) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers are the acrylic acids having the general structure

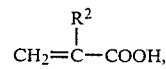

wherein $R^2$ is a substituent selected from the class consisting of hydrogen, halogen, and the cyanogen ($-C\equiv N$) groups, monovalent alkyl radicals, monovalent aryl radicals, monovalent aralkyl radicals, monovalent alkaryl radicals and monovalent cycloaliphatic radicals. Of this class, acrylic, methacrylic, and ethacrylic acid are most preferred. Another useful carboxylic monomer is maleic anhydride or the acid. The amount of acid used will be from about 95.5 to about 98.9 weight percent of the total monomers used. More preferably the range will be from about 96 to about 97.9 weight percent.

Acrylic ester monomers included derivatives of an acrylic acid represented by the formula

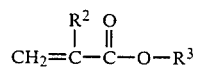

wherein $R^3$ is an alkyl group having from 10 to 30 carbon atoms, preferably 12 to 22 carbon atoms and $R^2$ is hydrogen, methyl or ethyl, present in the copolymer in amounts from about 1 to about 3.5 weight percent.

Representative acrylates include decyl acrylate, isodecyl acrylate, lauryl acrylate, dodecyl acrylate, streayl acrylate, and the corresponding methacrylates, decyl methacrylate, isodecyl methacrylate, lauryl methacrylate, dodecyl methacrylate, and stearyl methacrylate. Mixtures of two or three or more long chain acrylic esters may be successfully polymerized with one of the carboxylic monomers.

The polymers are crosslinked with a polyfunctional vinylidene monomer containing at least 2 terminal $CH_2<$ groups, including for example, butadiene, isoprene, divinyl benzene, divinyl naphthlene, allyl acrylates, and the like. Particularly useful crosslinking monomers for use in preparing the copolymers are polyalkenyl polyethers having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 4 carbon atoms and at least 2 hydroxyl groups. Compounds of this class may be produced by reacting an alkenyl halide, such as allyl chloride or allyl bromide with a strongly aklaline aqueous solution of one or more polyhydric alcohols. The product is a complex mixture of polyethers with varying numbers of ether groups. Analysis reveals the average number of ether groups on each molecule. Efficiency of the polyether crosslinking agent increases the number of potentially polymerizable groups on the molecule. It is preferred to utilize polyethers containing an average of two or more alkenyl ether groupings per molecule. Other crosslinking monomers include for example, diallyl esters, dimethallyl ethers, allyl or methallyl acrylates and acrylamides, tetraallyl tin, tetravinyl silane, polyalkenyl methane, diacrylates, and dimethacrylates, divinyl compounds such as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, ethylene diacrylate, ethylene dimethacrylate, triethylene glycol dimethacrylate, and the like. Allyl pentaerythritol, trimethylolpropane diallylether and allyl sucrose provide excellent polymers. The polymeric mixtures usually contain from 0.1 to less than 1 weight percent crosslinking monomer based on the total of carboxylic acid monomer plus other monomers, and more preferably about 0.1 to 0.6 weight percent.

Other vinylidene monomers may be used in place of the acid in small amounts so long as the basic properties of the thickening agents are not adversely affected. Examples include acrylonitrile, methacrylonitrile, acrylamide, methacrylamide, styrene, vinyl toluene, vinyl methyl ether, vinyl ethyl ketone, butadiene, vinyl acetate, methyl acrylate, butyl acrylate, cyanopropyl acrylate, methoxy ethyl acrylate, chloroethyl acrylate, vinyl chloride, vinylidene chloride, esters of maleic and fumaric acid, bis($\beta$-chloroethyl) vinyl phosphonates, and the like as are known to those skilled in the art.

The carboxyl containing polymers have molecular weights greater than about 500 to as high as several million, usually greater than about 10,000 to 900,000 or more.

Polymerization of the monomers is usually carried out in the presence of a free radical catalyst in a closed vessel in an inert atmosphere under autogenous pressure or artificially-induced pressure, or in an open vessel in an inert atmosphere under reflux at atmospheric pressure, in batch or continuous systems with proper agitation. Temperature of the polymerization may be varied from about 0° to 125° C. or lower or higher. Polymerization at 25° to 90° C. using a free radical catalyst is generally effective in producing polymer yields of 75 percent to 100 percent. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, di(2-ethylhexyl)peroxydicarbonate, and the like, as well as azo catalysts such as azodiisobutyryl nitrile. Other catalysts utilized are the so-called "redox" type of catalyst and the heavy-metal activated catalyst systems. Ultra-violet light may also be used as a source of free radicals. Some systems polyermize solely by heat, but catalysts provide better control. The monomers may be batch charged or continuously added during the course of polymerization, or by any other manner of polymerization techniques conventionally used.

The polymerizations are conducted in inert liquid media having some solubilizing effect on one or more of the monomeric ingredients, but substantially none on the resulting polymer. In other words, the medium used for the polymerization is one in which the monomers are preferably soluble and the polymer is substantially insoluble. Such materials are normally organic liquids which are solvents for the monomers, but nonsolvents for the polymers, or a mixture of such solvent so that the polymer product is preferably obtained as a very fine friable or fluffy precipitate. These solvents normally have solubility parameters of about 5 to about 10 $(cal/cm^3)^{\frac{1}{2}}$ and dilectric constants of about 1.7 to about 9.5. Typical solvents include hydrocarbon containing 6 to 8 carbon atoms, benzene, tetralin, hexane, heptane, cyclohexane, carbon tetrachloride, chloroform, trichloroethylene, methyl chloride, ethyl chloride, and methylene chloride; chlorofluoroalkanes such as chlorofluoromethane and chlorofluoroethane containing at least 4 halogen atoms; esters such as methyl acetate and ethyl acetate; alcohols including methanol, ethanol, butanol, and the like. The amount of organic medium used normally will be in excess of the monomers to be polymerized and the proportion may vary from at least 1 weight percent of monomers and 99 weight percent organic medium up to about 50 weight percent monomers and 50 weight percent medium.

Polymers made with monomer compositions included in this invention have been found to be efficient thickeners in textile printing, especially in cases where high ionic environments are encountered, such as in print pastes containing reactive dyes, direct dyes and disperse dyes with high ionic content. Under these ionic conditions, polymers of this invention were found to be more efficient than prior art polymers in thickening the print pastes. Furthermore, it was found that print pastes containing polymers of this invention can be printed at a considerably lower viscosity than prior art polymers to obtain good printing quality, sharp prints and high color yield. Consequently, lower levels of the polymers of this invention can be used to obtain good printing quality compared to prior art polymers.

Compared to the polymers covered by U.S. Pat. No. 3,915,921, polymers of this invention were found to produce print pastes which were less stringy and more buttery in rheology. This type of rheology was found to be better for screen-printing because there is less bounce-back of the print pastes on release of the pressure exerted by the print rod. Textile prints made with polymers of this invention have better penetration and are more level. Polymers made to have a less stringy rheology by increasing the amount of crosslinking monomer in the polymers produce prints which tend to wick (or flush) more than the polymers covered by this invention. These latter polymers produced prints which have an excellent combination of print sharpness (i.e., no wicking), penetration, levelness and color yield.

Such polymeric materials are readily obtained from monomer mixtures preferably of about 2.5 to about 3.5 weight percent of the long chain alkyl methacrylate, preferably where the chain contains about 12 to 22 carbon atoms, used with about 0.1 to about 0.6 weight percent of the crosslinking agent that is preferably allyl pentaerythritol, trimethylolpropane diallylether or allyl sucrose, with the remainder of the monomers being acrylic acid.

When these polymers contain much larger amounts of alkyl methacrylate, as 5 weight percent, printing pastes containing these thickening agents result in compositions having undesirable rheological properties and when used to print, as screen printing on fabric, poor color yield is observed as compared to pastes containing polymers of the composition set forth above that have desirable rheological properties and result in excellent color yield, that is, the resulting fabric has a higher color intensity after washing.

The amount of cross-linker is also critical in these polymers in many applications. The range may be from about 0.1 to about 0.6, more preferably to about 0.3. When larger amounts of cross-linker are used in printing paste compositions, i.e., 1 weight percent, the sensitivity to ion concentration increases and this results in variability, a lack of reproducibility, from one composition to another since the dyes and the like may have varying amounts of salts therein and there is not enough flexibility in the polymers containing the higher amounts of cross-linkers to accommodate this variation without extensive adjustments of recipes. Another problem related to larger amounts of crosslinkers is wicking of the printed image when paste compositions are used containing polymers with large amounts of cross-linking agents, that are outside the scope of the critical concentration and the necessary proportion of monomers of the polymers of this invention.

Polymers in the following Examples to demonstrate the practice and advantages of the invention were prepared by the following general procedure: Acrylic acid, the acrylate ester and cross-linking monomer were polymerized in a stirred reactor under an inert atmosphere using benzene as the polymerization media. The polymerizations were conducted about about 86° C. with a 17% monomer concentration in the benzene with lauryl peroxide as the initiator. On completion of the reaction, the polymers were dried in a rotoevaporator at 100° C. Weighed amounts of the polymers were added to 500 ml of distilled water and neutralized with aqueous sodium hydroxide to make mucilages containing 1% and 2% polymer. The viscosities of these mucilages were measured with a Brookfield viscometer at 20 rpm. Sodium chloride was added in water solutions sequentially to produce mucilages containing 1%, 2%, and 3% salt, and the viscosities were measured at each interval.

EXAMPLES

In a representative embodiment to demonstrate the preparation of the polymers, 1100 grams of benzene was charged to a stirred reactor equipped with a marine type agitator. 250.28 grams of acrylic acid, 5.72 grams of stearyl methacrylate and 0.858 grams of allyl pentaerythritol were added to the reactor and the measuring vessel rinsed with 200 grams of benzene which was added to the reactor. The reactor was heated to 78° C. and purged with 2 ft$^3$/hour of nitrogen for 30 minutes. 0.4 gram of lauryl peroxide in 50 grams of benzene was added to the reactor and the measuring vessel was rinsed with 50 grams of benzene that was added to the reactor. The polymerization reaction was allowed to run for 5 hours while controlling the temperature to 80° to 81° C. At the end of this period the polymer was dried at 100° C. in a Roto-evaporator. The resulting polymer was added to 500 ml of distilled water and nuetralized to pH 7 with 18 percent aqueous sodium hydroxide.

A series of polymers was prepared following the above procedure, using proportions of monomers set forth in Table 1. The viscosities of 1 percent and 2 percent polymer solution were determined with 0, 1%, 2% and 3% sodium chloride added to the mucilages. The viscosities, measured by the Brookfield Viscometer at 20 rpm, are set forth in Table 1.

To demonstrate one of the advantages and uses of the novel polymers of this invention, print paste formulations were made with the polymer for testing as to rheology and viscosity of the paste, and when printed on a substrate, wicking and color yield. First, a clear concentrate of the polymer was prepared by adding 20 weight parts of the polymer to 65 weight parts of mineral spirits (isoparaffinic mixture, b.p. 207°–254° C.) and mixed for 20 minutes. 15 weight parts of sodium carbonate was then stirred into the mixture and this was mixed for 20 minutes to make the desired neutralized solution of polymer salt. Two basic print paste formulations were prepared, one with a black dye and one with a red dye. The following general recipe was followed.

TABLE 1

| Polymer | Wt. % Stearyl Methacrylate | Wt. % Acrylic Acid | phm[a] APE | BROOKFIELD VISCOSITY × 10$^3$ CPS | | | | | | | |
|---|---|---|---|---|---|---|---|---|---|---|---|
| | | | | 1% Polymer with Added Salt | | | | 2% Polymer with Added Salt | | | |
| | | | | 0% | 1% | 2% | 3% | 0% | 1% | 2% | 3% |
| A1 | 2.0 | 98.0 | 0.3 | 12.5 | 8.4 | 6.6 | 3.8 | 23.5 | 21.5 | 22.0 | 20.5 |
| A2 | 2.0 | 98.0 | 0.4 | 17.5 | 10.2 | 6.4 | 3.6 | 32.5 | 30.0 | 27.5 | 24.5 |
| A3 | 2.0 | 98.0 | 0.5 | 29.0 | 13.0 | 5.6 | 2.7 | 52.0 | 40.0 | 32.5 | 26.0 |
| A4 | 2.0 | 98.0 | 0.6 | 48.0 | 16.0 | 5.6 | 2.6 | 74.0 | 60.0 | 38.5 | 25.5 |
| B1 | 3.0 | 97.0 | 0.2 | 6.6 | 11.5 | 7.0 | 4.0 | 21.5 | 50.0 | 40.0 | 36.0 |
| B2 | 3.0 | 97.0 | 0.3 | 19.0 | 12.5 | 7.0 | 3.6 | 40.0 | 44.0 | 40.5 | 33.0 |
| B3 | 3.0 | 97.0 | 0.4 | 27.5 | 13.0 | 5.0 | 2.6 | 56.0 | 64.0 | 43.5 | 32.0 |
| B4 | 3.0 | 97.0 | 0.5 | 35.0 | 13.2 | 3.6 | 1.5 | 84.0 | 72.0 | 41.5 | 28.5 |

[a]phm = parts per hundred of monomer

| | | |
|---|---|---|
| Water | (1) | (1) |
| Silicone/antifoam | 0.5 | 0.5 |
| Surfactant | 3 drops | 3 drops |
| Reactive Red 24[a] | 4.0 | — |
| Reactive Black 4[a] | — | 8.0 |
| Urea | 10 | 10 |
| Sodium m-nitrobenzene sulfonate | 0.5 | 0.5 |
| Hot water | 37.5 | 37.5 |
| 20% polymer concentrate | (2) | (3) |
| KHCO$_3$ | 3.0 | 2.5 |
| Na$_2$CO$_3$ | | 1.2 |
| Total weight percent | 100 | 100 |

(1) variable as needed to make 100 percent.
(2) in amounts to add 0.7 to 1.5 percent polymer.
(3) in amounts to add 1.2 to 2.0 percent polymer.
[a] monochlorotriazine dyes (Ciba-Geigy).

The general mixing procedure is to dissolve the silicone antifoam and surfactant nonylphenoxypoly(ethyleneoxy)ethanol in cold water in a vessel equipped with a marine agitator. Add the dye to this solution, and then the urea dissolved in the hot water. The polymer concentrate is added as required to obtain the desired percent polymer in the formulation, i.e., 6 percent of 20 percent concentrate to obtain 1.2 percent polymer in the formulation, and mix for 20 minutes. Then add the KHCO$_3$ and/or Na$_2$CO$_3$ to the formulation and mix for 20 minutes.

Using the print paste formulation set forth above, print paste formulations with (1) Reactive Black 8 and (2) Reactive Red 24 dyes were prepared with varying amounts of a polymer of 3 weight percent stearyl methacrylate and 97 weight percent acrylic acid, with 0.4 parts per hundred of these two monomers of allyl pentaerythritol. The paste viscosity was determined with a Brookfield Viscometer at 20 rpm. The pastes were then used to screen print on cotton fabric. After printing, the printed fabric was dried for 5 minutes at 100° C., steamed for 10 minutes at 105° C. with 100% saturated steam, rinsed with cold water, agitated in a water solution of Igepal CO-630 for 5 minutes at 100° C., rinsed in cold water, and dried for 10 minutes at 100° C. The amount of wicking, if any, was measured in mm. The color values (k/s) were determined by a Photovolt Reflection Meter, used to determine the reflection in percent of the printed sample. This reflection reading (R) is substituted into a modified form of the Kubelka-Munk equation as follows:

Color Value = K/S = $(100-R)^2/2R$ (E. R. Trotman, "Dyeing and Chemical Technology of Textile Fibers," page 643, 4th Edition, 1970, Charles Griffin & Company Ltd., London, England). The polymer concentrations used and the test results obtained are set forth in Table 2.

TABLE 2

| Reactive Black 8 (8%) | |
|---|---|
| 1.2% Thickener | |
| Paste Viscosity (cps) | 4700 |
| Wicking (mm) | 0 |
| Color Value (k/s) | 2842 |
| 1.5% Thickener | |
| Paste Viscosity (cps) | 7800 |
| Wicking (mm) | 0 |
| Color Value (k/s) | 2842 |
| 2.0% Thickener | |
| Paste Viscosity (cps) | 25000 |
| Wicking (mm) | 0 |
| Color Value (k/s) | 3472 |

TABLE 2-continued

| Reactive Red 24 (4%) | |
|---|---|
| 0.7% Thickener | |
| Paste Viscosity (cps) | 1950 |
| Wicking (mm) | 0 |
| Color Value (k/s) | 306 |
| 1.2% Thickener | |
| Paste Viscosity (cps) | 12000 |
| Wicking (mm) | 0 |
| Color Value (k/s) | 381 |
| 1.5% Thickener | |
| Paste Viscosity (cps) | 21500 |
| Wicking (mm) | 0 |
| Color Value (k/s) | 356 |

While a print paste formulation of 8 percent Reactive Black 8 and containing 1.0 percent of a polymer containing 5 percent stearyl methacrylate, 0.1 weight percent allyl pentaerythritol and 94.9 percent acrylic acid has good salt or ion resistance, i.e., hign print paste viscosity, the rheology is unsatisfactory, the paste being so stringy as to be almost impossible to screen print and the resulting prints have a very poor color yield value. When this formulation was prepared with a polymer containing 3 weight percent stearyl methacrylate and 0.3 weight percent allyl pentaerythritol, the resulting paste formulations had improved rheology of such a nature that screen printing could be accomplished with no wicking and good color yield. When a polymer of 3 weight percent stearyl methacrylate and 0.8 weight percent allyl pentaerythritol was used in the formulation, the resulting formulation had minimum salt resistance, that is, very low paste viscosity, and while the color yield was not unsatisfactory, very bad wicking and a blurred print was observed.

We claim:

1. Polymers of a monomeric mixture containing 95.9 to 98.8 weight percent of an olefinically unsaturated carboxylic monomer selected from the group consisting of acrylic, methacrylic and ethacrylic acids, about 1 to about 3.5 weight percent of an acrylate ester of the formula

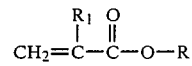

wherein R is an alkyl radical containing 10 to 30 carbon atoms and R$_1$ is hydrogen, methyl or ethyl, and 0.1 to 0.6 weight percent of a polymerizable cross-linking polyalkenyl polyether of a polyhydric alcohol containing more than one alkenyl ether group per molecule wherein the parent polyhydric alcohol contains at least 3 carbon atoms and at least 3 hydroxyl groups.

2. A polymer of claim 1 wherein there is about 96 to 97.9 weight percent of acrylic acid, about 2.5 to about 3.5 weight percent of acrylate esters wherein the alkyl group contains 12 to 22 carbon atoms, and R$_1$ is methyl, and the amount of cross-linking monomer is from about 0.2 to 0.4 weight percent.

3. A polymer of claim 2 wherein the cross-linking monomers are allyl pentaerythritol, trimethylolpropane diallylether or allyl sucrose.

4. A polymer of claim 3 wherein the acrylate ester is stearyl methacrylate in amount of about 3 to about 3.5 weight percent, and there is present about 0.2 to 0.4 weight percent allyl pentaerythritol.

5. Print paste compositions comprising a dye, a liquid carrier and a salt resistant water thickening salt of a polymer of about 2.5 to about 3.5 weight percent acrylate ester of the formula

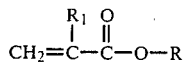

wherein R is an alkyl radical containing 10 to 30 carbon atoms and $R_1$ is hydrogen or methyl, about 0.2 to about 0.6 weight percent of a polymerizable cross-linking monomer containing a $CH_2=C<$ grouping and at least one other unsaturated double bond, said unsaturated double bonds being non-conjugated with respect to each other, and about 95.9 to about 97.3 weight percent of acrylic acid.

6. A composition of claim 5 wherein in the acrylate ester $R_1$ is methyl and there is present about 0.2 to about 0.4 weight percent of allyl pentaerythritol, trimethylolpropane diallyl ether or allyl sucrose cross-linking agents.

7. A composition of claim 6 wherein the acrylate ester is stearyl methacrylate present in amounts of about 3 weight percent and the cross-linking agent is allyl pentaerythritol.

* * * * *